C W and W W Marsh,
Harvester Rake.
No. 1719 Reissued July 5. 1864
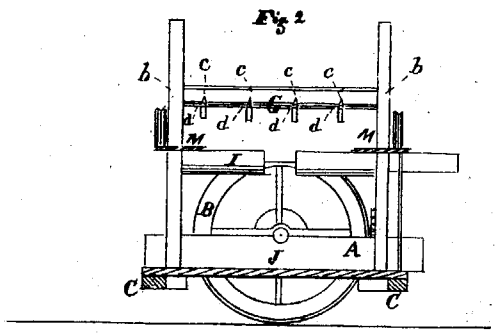
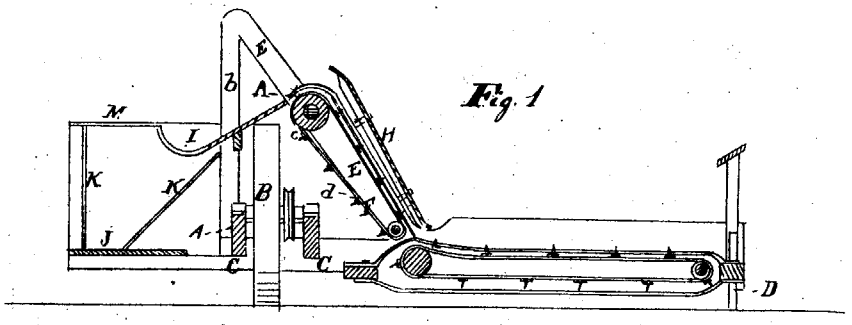
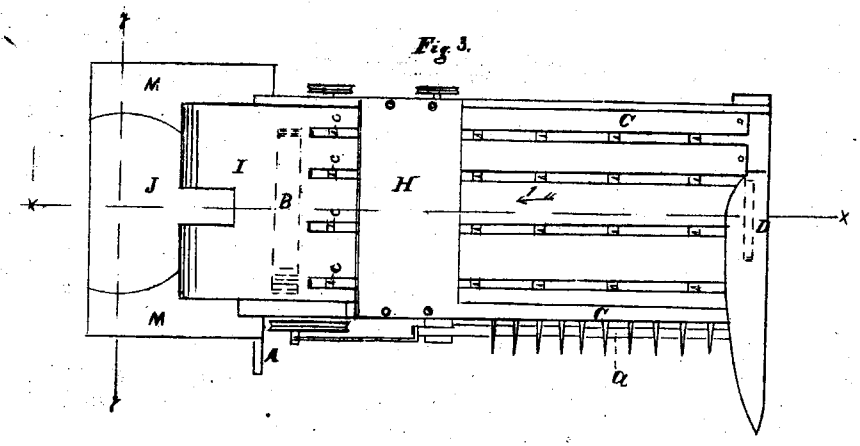
Witness
G. H. Stewart
J. F. Hollister
C. W. & W. W. Marsh

UNITED STATES PATENT OFFICE.

C. W. MARSH AND W. W. MARSH, OF CLINTON, ILLINOIS.

IMPROVEMENT IN REAPING-MACHINES.

Specification forming part of Letters Patent No. 21,207, dated August 17, 1858; Reissue No. 1,719, dated July 5, 1864.

*To all whom it may concern:*

Be it known that we, C. W. MARSH and W. W. MARSH, of Clinton, in the county of De Kalb, in the State of Illinois, have invented a new and useful Improvement in Harvesters, which we have entitled a "Hand Binding Attachment to Harvesters;" and we do declare that the following is a full, clear, and exact description of the same, reference being had to the annexed drawings, making a part of this specification, in which—

Figure 1 is a longitudinal vertical section of our invention, taken in the line *x x*, Fig. 3. Fig. 2 is a transverse vertical section of the same, taken in the line *y y*, Fig. 3. Fig. 3 is plan or top view of the same.

Similar letters of reference indicate corresponding parts in the several figures.

This invention relates to an improved arrangement of parts applied to a reaping-machine or harvester for the purpose of enabling an attendant or attendants standing thereon to bind the cut grain (which is delivered to them as hereinafter described) with facility into sheaves.

To enable those skilled in the art to fully understand and construct our invention, we will proceed to describe it.

A represents the main frame of a harvester. B is the driving-wheel, and C is the platform-frame, within which are placed the drive-wheel B and grain-wheel D at their places—viz., the grain-wheel at the left of the cutting apparatus, which may be the ordinary reciprocating sickle, *a*, placed in front of the platform-frame C, operated in the ordinary manner from the drive-wheel B at the right, said platform-frame C being attached to the main frame A.

Within the platform-frame C, behind the sickle *a*, may be placed a band of rakes or other self-raking device, which shall carry the cut grain in the direction shown by the arrow, 1, Fig. 3. To the inner side of said platform-frame C an inclined frame, E, is attached, supported at the upper end by uprights *b b*, Fig. 2, having an endless band of rakes, F, placed within it, which have the same inclination as the frame E. The grooved plate G, through the groove of which the teeth *c* of the bars *d* of the band F project, terminates in a concave or grain-receiver, I, the length of which may be about equal, or it may slightly exceed, the width of the platform-frame C and frame E. The concave or grain-receiver I projects over the side of the main frame A, and is partially supported by braces K K from a platform, J.

At each end of the concave or grain-receiver I a table is placed, (see Fig. 3,) and attached to the uprights *b b*, (see Fig. 2,) and supported from platform J, or in any equivalent manner. These tables M M are the binders' tables, and are at a convenient height above the platform J for the manual operation of binding; and the concave or grain-receiver I, being constructed of zinc or other thin and smooth metallic substance, by its pliability and smoothness offers no resistance to the hands of the operators. The platform J, which is the binders' platform, is placed at the right end of the platform-frame C, longitudinally with drive-wheel B and grain-wheel D, as shown in Figs. 1 and 3.

The operation is as follows: As the harvester is drawn along, the cut grain, falling on the self-raking platform placed behind the sickle *a*, the ordinary reel being used, is conveyed to the endless band of rakes F, (operated by any proper means,) and by them is delivered in a continuous stream into the metallic concave or grain-receiver I. One or more attendants stand on platform J and bind the grain into sheaves, the grain being encompassed by the bands in the concave or grain-receiver I and removed therefrom and the bands twisted on the tables M M, from whence they are deposited on the ground. As the aforesaid binders' platform J and tables M M are placed at and supported from the right end of the platform-frame C, the binders, as they pass the band under the bundle, but will have the heads of the grain (lying in the concave or grain-receiver I) toward their left hands, and when the bundles are removed to the tables M M the heads retain the same relative position, which is the only proper and convenient position for binding with facility; and, further, as the said binders' platform J is attached to the end of the frame C longitudinally with the drive-wheel B and grain-wheel D, it follows that the weight of the binders, in conjunction with the weight of the machine, comes squarely upon the drive-wheel B, holding it by this weight more firmly to the ground, and thereby imparting the necessary steadiness (the drive-wheel B crushing down the obstructions) required by the binders standing upon their platform.

Having thus described our invention, we claim as new, and desire to secure by Letters Patent—

1. The binders' tables M M, when used in connection with the trough or grain-receiver I, substantially as and for the purpose specified.

2. The binders' platform J, when used in connection with the binders' tables M M, as and for the purpose set forth.

3. The tables M M and platform J, when used in combination with the concave or grain-receiver I, substantially as and for the purpose set forth.

In testimony whereof we, the said C. W. MARSH and W. W. MARSH, hereto subscribe our names, in the presence of the witnesses whose names are hereto subscribed, on the 23d day of April, 1864.

C. W. MARSH.
W. W. WARSH.

In presence of—
SAMUEL MARSH,
ALBERT HINDS.